Oct. 24, 1967　　　G. A. WYATT　　　3,349,164
INSULATIVE STRESS RELIEF FILM
Filed Dec. 28, 1965

INVENTOR.
GERALD A. WYATT
BY
Carpenter, Kinney & Coulter
ATTORNEYS

United States Patent Office 3,349,164
Patented Oct. 24, 1967

3,349,164
INSULATIVE STRESS RELIEF FILM
Gerald A. Wyatt, Shoreview, Minn., assignor to Minnesota Mining and Manufacturing Company, St. Paul, Minn., a corporation of Delaware
Filed Dec. 28, 1965, Ser. No. 517,038
8 Claims. (Cl. 174—73)

ABSTRACT OF THE DISCLOSURE

An insulating film contains overlapping spaced thin small electrically conductive platelets oriented to provide a high dielectric constant in the plane of the film.

Figure 1:
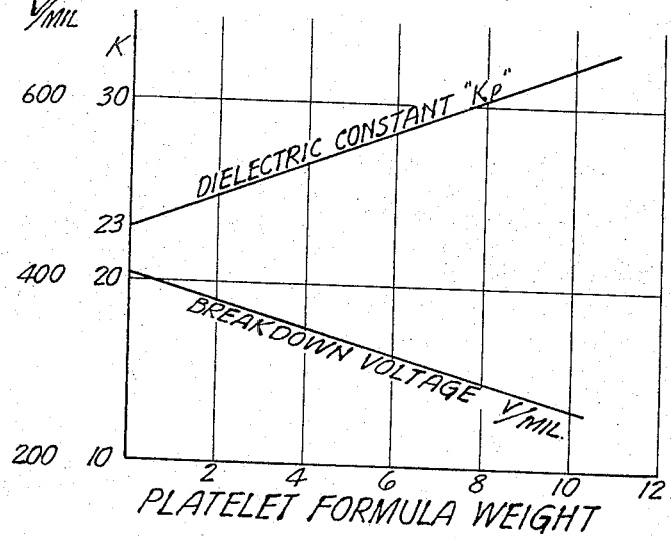

This invention relates to the transmission of electric power and more particularly to the relief of localized high electrical stresses in power transmission lines and systems. There is provided novel means for reduction of voltage gradient or field intensity at splices, junctions, and other points subject to excessive electrical flux concentration.

As one illustrative example of situations wherein excessive flux may be concentrated, attention may be directed to terminations on high voltage power cables. With the insulated conductor at a high potential and the shield at ground potential, the electric field intensity at the end of the shield is frequently sufficient to disrupt the insulation.

Prior attempts to relieve or equalize localized stresses at such areas have generally involved the application of conductive stress cones as in U.S. Patent No. 2,945,913, or wrapping with alternate servings of conductive and insulative foil or film to form a capacitive or cone-like covering as in U.S. Patent No. 2,276,923, or the application of semiconductive coatings as in U.S. Patent No. 3,066,180. Stress cones must be accurately fitted to the cable and are necessarily bulky and awkward. Consecutive wrappings of metal foil and insulating film are difficult and tedious to apply and may also be undesirably bulky. Semi-conductive coverings of desired and consistent uniformity are difficult to produce particularly when necessarily applied under field or emergency conditions.

The present invention avoids these and other defects and deficiencies of prior art stress-relief methods and installations. There is provided a covering material which occupies a minimum of space and is easily and efficiently applied in any desired location to provide an effective capacitive covering. As an illustration, a termination on a No. 2, 15 kv., polyethylene insulated, shielded single conductor cable protected with a capacitive covering in accordance with one form of the invention was increased only about three-tenths of an inch in diameter; yet the corona starting voltage was found to be between 15 and 17 kv. Corona starting voltage measurements provide a useful test for the effectiveness of stress-equalizing structure.

According to the invention there is provided a thin insulating covering, in the form of a film, tape or coating, having a breakdown voltage of at least about 200 volts per mil, and having a dielectric constant $K_P$ in the plane of the film of at least about ten and at least about one-fourth greater than the dielectric constant $K_I$ in the direction incident or perpendicular thereto. Such a covering consists essentially of a flexible and conformable organic plastic film-forming composition containing overlapping spaced thin small electrically conductive platelets uniformly distributed within the composition and planarly oriented in the plane of the film or covering.

Plastic composition based on highly polar organic polymer material which itself has a high dielectric constant are preferred. Copolymers of butadiene and acrylonitrile are particularly useful; such nitrile rubbers may for example exhibit a dielectric constant in the neighborhood of 15. Polymers containing halogen atoms, such for example as neoprene and polyvinyl chloride, are somewhat lower in dielectric constant but are useful for less critical applications. Reinforcing pigments may be added to impart increased mechanical strength. Softer or lower molecular weight polymers provide easier handling characteristics; low molecular weight materials serving as plasticizers may be used for the same purpose with higher molecular weight polymers. Curing agents and other additives may be incorporated where desired, in all cases with due attention to any adverse effects caused by selection of materials having known limitations in such compositions.

Aluminum flake is particularly desirable as the conductive platelet material, since it is readily available, inexpensive, lightweight, uniform in size, and essentially inert toward the components of the plastic composition. Flakes of other metals are also useful, copper flakes being an illustrative example; and other conductive platelets, for example metal coated mica flakes, are also contemplated as coming within the scope of the invention.

In the preferred structure, the dielectric constant $K_P$ in the plane of the film is identical in all directions within the plane, and the platelets are essentially circular. For some applications it may be possible or even desirable to employ platelet structures of other shapes, for example elongate ovals or rectangles, or short strings or clusters of mutually contacting particles, which are then oriented not only planarly but with the long axis in the direction of the orienting force.

Orientation of the platelets is conveniently accomplished by extrusion of the mixture, e.g. from an extrusion press or between rolls of a calender. Coating from suspension in a volatile liquid vehicle and in thin layers is also effective but requires multiple coats with intermediate drying to build up the required thickness and is therefore less desirable.

The following procedures are employed in determining the numerical values of various properties of the material.

The dielectric constant is determined in the plane indicated, using a guard ring electrode arrangement and operating at 100 kilocycles. The "plane" of the covering or film will be understood to be the flat dimension even though the film may be coiled around a cable or otherwise distorted from the true planar condition. A test sample for use in determining $K_P$ is conveniently obtained by sectioning from a stack or roll containing a suitable number of layers of the planar film.

The breakdown voltage is determined on films of between 10 and 30 mils (.01–.03 inch, .25–.75 mm.) thickness, using quarter-inch flat-ended brass rod electrodes and a rate of voltage rise of 500 volts per second.

Initial corona discharge is determined at 100 kilocycles, using a tuned filter circuit with an oscilloscope display and having a sensitivity of $10^{-12}$ coulombs, by progressively increasing the applied voltage and noting the voltage at which initial distortion of the trace is observed.

Figure 2:
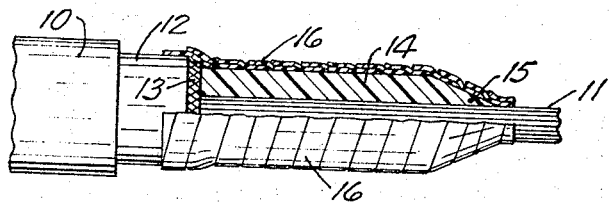
Figure 4:
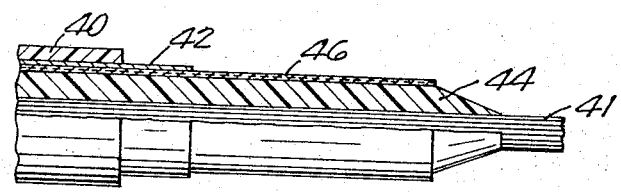
Figure 3:
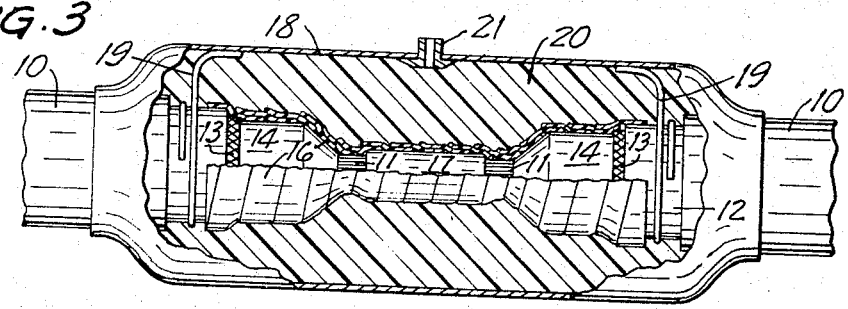
Figure 5:
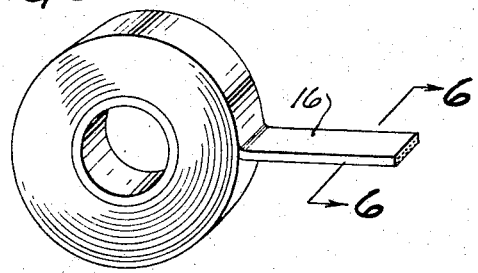
Figure 6:

In the drawing,

FIGURE 1 is a graphic representation showing the variation in values of dielectric constant $K_P$ and breakdown voltage with variations in the concentration of planarly oriented conductive platelets, as determined on an illustrative product of the invention, FIGURE 2 is a view partly in cross-section depicting a portion of a protected cable termination, FIGURE 3 is a similar view showing a completed splice between two cable-ends, FIGURE 4 is a similar view showing a cable termination wherein the cable is self-protected, FIGURE 5 represents in perspective one form in which the product of the invention may be supplied, and FIGURE 6 schematically represents the product of FIGURE 5 shown in cross-section as indicated by line 6—6.

The following specific examples will serve further to illustrate but not to limit the invention. All compositions are in parts by weight unless otherwise indicated.

*Example 1*

A plastic film-forming composition is prepared by mixing together in a heavy duty internal mixer

|  | Parts |
|---|---|
| Polyvinyl chloride resin | 100 |
| Polymeric plasticizer | 40 |
| Liquid plasticizer (dioctyl phthalate) | 15 |
| Lead silicate ("Plumb-O-Sil B") | 1 |
| Dibasic lead phosphate | 2.5 |
| Aluminum flake (Reynolds 2–832) | 11.5 |

The lead silicate and dibasic lead phosphate are added as processing aids and are optional. The aluminum flake particles have a substantially circular shape and are about two mils in diameter and .04 mil thick; they are added to the previously well-mixed and heat-softened film-forming composition. The composition is then extruded at elevated temperature through a die having an elongate slit opening with a width of 10 mils.

The resulting film is lightly coated on one surface with a solution, in heptane and ethyl acetate, of a pressure-sensitive adhesive copolymer of isooctyl acrylate and acrylic acid to a coating weight, after solvent removal, of about six grains per 24 sq. in., and the coated film is slit to ¾ inch width and wound up in roll form. A silicone-treated paper or parchment liner may be placed over the adhesive surface if desired, or the plastic film may be lightly coated over the non-adhesive surface with a low-adhesion backside, to assure easy unwinding of the tape from the roll.

The tape product has a dielectric constant $K_P=10.9$ and $K_I=5.6$. i.e. about a two to one ratio. The breakdown voltage is 500 volts per mil. The aluminum platelets are oriented by the extrusion process, the planes of the particles being generally parallel to the plane of the extruded film, and the particles are in mutually overlapping relationship, as indicated by the significant differences between $K_P$ and $K_I$.

A No. 2 single stranded conductor 15 kv. polyethylene insulated shielded power cable is prepared for terminating. As indicated in FIGURE 2, for such purposes the outer sheath 10 is cut back a distance of for example about 10 inches from the end of the conductor 11. The flexible metal shield 12 is permitted to extend about 1¼ inches past the end of the sheath, and the semiconductive fabric 13 about ⅛ inch past the end of the shield. The inner polyethylene insulation 14 extends for a total of about nine inches from the end of the fabric 13, the last inch being tapered in a pencil point 15; and the stranded copper conductor 11 extends past the insulation about 1½ inches, i.e. a distance sufficient for installation of a suitable cap or tube connector element, not here shown. No. 2 AWG conductor has a cross-section area of 66,560 circular mils.

The tape product 16 is spirally wrapped about the extended end of the shield 12 and fabric 13 and over the exposed surface of the insulation 14 and into contact with the conductor 11, using approximately half overlap as shown in FIGURE 2. For convenience in testing, a short section of cable is ordinarily provided with identical terminations at each end and the entire section then placed under test. The corona starting voltage is 9.0 kv. The termination is further tested in a step voltage test beginning at 25 kv. for 5 minutes and continuing for 5 minutes at each increased interval of 5 kv., failure occurring at 65 kv.

In the absence of the wrapping of tape, initial corona discharge is found to occur at about 6–6.5 kv.

In another test, a splice as illustrated in FIG. 3 is made between terminals of No. 2 15 kv. rubber-insulated shielded cable similarly prepared except that the length of inner insulation 14 exposed at each terminal is three inches, the conductors are joined with a soldered copper ferrule 17, the wrapping of tape 16 extends over the entire splice area between the shields 12, and the splice area is protected with a tubular metal shell 18 having contact with both shields through soldered ground wires 19 and spaced from the insulated conductor, the entire splice area being encapsulated in epoxy resin self-curing insulating potting compound 20 introduced in liquid form through a port 21. The corona starting voltage is 10.8 kv. The splice is continuously subjected to 15 kv. at 200 amperes without failure for more than ten months.

*Example 2*

The following composition is prepared by combining the ingredients, added in the order named, on rubber-mill rolls.

| | |
|---|---|
| Rubbery butadiene-acrylonitrile copolymer ("Hycar 1042") | 100 |
| Zinc oxide | 5 |
| Aluminum flake (Reynolds 2–832) | 8 |
| Carbon black | 50 |
| Gasoline-insoluble pine wood resin ("Vinsol" resin) | 10 |
| Liquid butadiene-acrylonitrile copolymer ("Hycar 1312") | 20 |

The mill base is sheeted out on a calender to a thickness of 20 mils and is slit to ¾ inch width and wound up in rolls for storage. Portions of the film are tested for dielectric constant and for breakdown. The values for dielectric constant are $K_P=30.9$, $K_I=19.0$, a ratio of about 3/2. Breakdown occurs at 280 volts/mil.

The tape under tension is applied by hand over the end of a No. 2 cable prepared as described in Example 1, with half lap and extending from the shield to the bare conductor, i.e. over the entire nine inches of exposed polyethylene insulation, and the termination is subjected to test. The corona starting voltage is 11.5 kv. Flashover of the termination at 80 kv. terminates the test, without failure of the taped area.

The tape product of this example is softer and more flexible and conforms more closely to irrgular surfaces over which it is applied than does the product of Example 1, and is preferred. The tension applied during winding of the termination is sufficient to cause stretching of the tape and reduction in thickness by about one-fifth, the final covering being about 30–35 mils in thickness. A smooth, tightly fitting, well-adhered and essentially void-free covering is provided.

*Example 3*

A first composition is prepared by combining the following components on a rubber-mill in the order indicated:

| | |
|---|---|
| Rubbery butadiene-acrylonitrile copolymer ("Hycar 1042") | 100 |
| Zinc oxide | 5 |
| Aluminum flake (Reynolds 2–832) | 4 |
| Reinforcing pigment (carbon black) | 50 |
| "Vinsol" resin | 10 |
| Liquid butadiene-acrylonitrile copolymer ("Hycar 1312") | 10 |
| Curing agent (tetramethylthiuram disulfide) | 3.5 |
| Stearic acid | 1 |

The mixture is sheeted out on a calender as a 15 mil film, wound up on a paper liner, and cured in an oven for one hour at 300° F. The cured film is flexible and resilient. The aluminum flakes are oriented in the plane of the film by the calendering action.

A second mixture is similarly separately prepared from the following:

| | |
|---|---|
| Rubbery butadiene-acrylonitrile copolymer | 100 |
| Zinc oxide | 5 |
| Aluminum flake | 4 |
| Carbon black | 50 |
| "Vinsol" resin | 10 |
| Liquid butadiene-acrylonitrile copolymer | 35 | and the mixture is calendered onto the cured film in an equal thickness, the total thickness then being 30 mils. The product is slit into ¾ inch widths and wound up in roll form on a silicone-treated glassine liner.

The dielectric constant $K_P=26.5$, $K_I=17.2$, the ratio being about 3/2. The breakdown voltage is 411 volts per mil.

The tape is applied to terminations of No. 2 cable prepared as illustrated in FIGURE 2 and with the half-lap winding extending two, four, six and eight inches along the nine inch exposed length of polyethylene inner insulation 14 from the edge of the semi-conducting member 13. In other test samples additional layers of the tape are similarly applied, to provide one, two, and three windings of half-lapped tape. Each winding adds approximately 45 mils to the radius of the portion covered. Increasing potential is applied between the shield and conductor and the voltage is determined at which fluctuation is first observed on the oscilloscope due to corona discharge. The results are tabulated below.

| No. of Windings | Length, in. | Corona at— (kv.) |
|---|---|---|
| 1 | 2 | 11.5 |
| | 4 | 11.5 |
| | 6 | 11.4 |
| | 8 | 11.3 |
| 2 | 2 | 14.6 |
| | 4 | 15.0 |
| | 6 | 14.9 |
| | 8 | 14.6 |
| 3 | 2 | 17.4 |
| | 4 | 16.5 |
| | 6 | 15.6 |
| | 8 | 14.6 |

Example 3 with four formula parts of aluminum on 100 parts of rubbery polymer, and Example 2 with eight parts, represent a preferred range of platelet proportions in which the dielectric constant $K_P$ is increased by at least about one-fourth over the value for $K_I$, while the breakdown voltage remains at or above about 300 volts per mil.

*Example 4*

A brushable liquid composition is prepared by mixing together in a ball mill the following materials:

| | |
|---|---|
| Rubbery butadiene-acrylonitrile copolymer | 100 |
| Liquid butadiene-acrylonitrile copolymer | 20 |
| Zinc oxide | 5 |
| Aluminum flake | 4 |
| Carbon black | 50 |
| Tetramethylthiuram disulfide | 3.5 |
| Acetone | 800 |
| Toluene | 200 |

A No. 2 cable termination prepared as previously indicated is given three coats of the liquid, applied with a paintbrush and with intermediate drying, to produce a total thickness of about six mils. The coating extends from the end of the shield over the entire exposed surface of the polyethylene insulation. After curing at elevated temperature, the specimen is subjected to test. The corona starting voltage is 18.8 kv.

In another test, the sheath 10, shield 12, and semi-conductive layer 13 are removed from an entire section of No. 2 cable and the exposed polyethylene insulation surface is given two brush coats of the liquid composition, with intermediate drying and final curing. The cured coating is essentially uniform and about four mils thick. The shield and sheath are then replaced, being held in place by an outer winding of resilient plastic electrical insulating tape. A termination is prepared as illustrated in FIGURE 4, wherein are shown the stranded conductor 41, polyethylene insulation 44, cured coating 46, shield 42, and sheath 40. Corona starting voltage of the termination is 11.0 kv. An impulse flashover test is also performed; the termination successfully resists five impulse tests to 187 kv. without flashover, whereas portions of the initial cable similarly tested fail in five out of six attempts.

*Example 5*

The following are combined on the rubber-mill:

| | |
|---|---|
| Rubbery butadiene-acrylonitrile copolymer | 100 |
| Zinc oxide | 5 |
| Aluminum flake | 12 |
| Silica powder ("Hi-Sil 233") | 50 |
| "Vinsol" resin | 10 |
| Liquid butadiene-acrylonitrile copolymer | 20 |

The mill batch is formed by calendering into a film having a thickness of 20 mils which is then slit to ¾ inch width. Dielectric constant $K_P=20.3$, $K_I=13.6$. Breakdown voltage is 408 volts/mil. The tape is applied to a No. 2 cable termination over the entire length of exposed inner insulation as a stress relief covering having a thickness of approximately 30 mils, by winding at half overlap under firm hand tension. The corona starting voltage is 11.0 kv.

In calculating the concentration of conductive platelets it has been found convenient to consider aluminum flake of approximately the size and shape employed in the examples and to ignore the carbon black, silica powder or other reinforcing fillers as well as the small proportions of curing agents or other additives not essential in providing a plastic film-forming composition. Thus in Example 3 the weight of the aluminum flake is slightly more than 3% of the weight of organic plastic film-forming composition in the cured backing portion, and slightly less than 3% in the uncured adhesive portion. Preferred results are obtained where the weight of aluminum flake of the indicated particle size is between about three and about nine percent of the weight of the plastic portion. Where materials other than aluminum or of other specific shape or size are employed, the weight must be modified to provide essentially the same total platelet area as obtained with the indicated weights of the indicated particles.

What is claimed is as follows:

1. A thin insulating film having a breakdown voltage of at least about 200 volts per mil and a dielectric constant in the plane of the film of at least about ten and at least about one-fourth greater than the dielectric constant in the direction perpendicular thereto, said film consisting essentially of flexible and conformable organic plastic film-forming composition containing overlapping spaced thin small electrically conductive platelets uniformly distributed therethrough and planarly oriented in the plane of said film.

2. A thin flexible insulating film as defined in claim 1, having a breakdown voltage of at least about 300 volts per mil and wherein said platelets are metal and are present in an amount equivalent to from about three to about nine parts by weight of aluminum flakes of about 2 mils diameter and .04 mil thickness for each 100 parts of said plastic composition.

3. A thin flexible insulating film as defined in claim 2, wherein said plastic composition is a plasticized highly polar rubbery organic polymer and said metal platelets are aluminum, at least one surface of said film being normally tacky and adherent.

4. A thin flexible insulating film as defined in claim 3, wherein the organic polymer is a plasticized rubbery copolymer of monomers consisting essentially of butadiene and acrylonitrile and wherein the aluminum platelets are in an amount by weight equal to about one-third to one-ninth the weight of said plasticized copolymer.

5. A thin flexible insulating film as defined in claim 1 in self-sustaining sheet form and wherein at least one surface of said film is normally tacky and adherent.

6. A thin flexible insulating film as defined in claim 5 and in the form of a narrow elongate pressure-sensitive adhesive tape.

7. A thin insulating film as defined in claim 1, forming a tubular covering on an insulated electrical conductor.

8. A thin insulating film as defined in claim 1, forming a tubular covering on a terminal portion of an insulated electrical conductor enclosed within a conductive shield, said covering enclosing the end portion of the shield and at least about a two-inch length of the unshielded insulated conductor adjacent thereto.

References Cited

UNITED STATES PATENTS

| | | | |
|---|---|---|---|
| 1,771,749 | 7/1930 | Eisenhardt | 161—60 |
| 3,287,202 | 11/1966 | Petriello | 161—60 |

LARAMIE E. ASKIN, *Primary Examiner.*